United States Patent
Spence et al.

(10) Patent No.: US 8,597,747 B2
(45) Date of Patent: Dec. 3, 2013

(54) MULTI-LAYER ROTATIONALLY MOLDED LOW PERMEATION VESSELS AND METHOD FOR MANUFACTURE THEROF

(75) Inventors: Alvin G. Spence, Coralville, IA (US); Jeremy R. Knepper, Iowa City, IA (US); Daniel D. Grimes, North Liberty, IA (US)

(73) Assignee: Centro, Inc., North Liberty, IA (US)

( * ) Notice: Subject to any disclaimer, the term of this patent is extended or adjusted under 35 U.S.C. 154(b) by 681 days.

(21) Appl. No.: 11/999,756

(22) Filed: Dec. 7, 2007

(65) Prior Publication Data

US 2008/0145582 A1 Jun. 19, 2008

Related U.S. Application Data

(60) Provisional application No. 60/875,196, filed on Dec. 15, 2006.

(51) Int. Cl.
*B29D 22/00* (2006.01)

(52) U.S. Cl.
USPC .......................................... 428/35.7

(58) Field of Classification Search
USPC .......................................... 428/35.7
See application file for complete search history.

(56) References Cited

U.S. PATENT DOCUMENTS

| | | | |
|---|---|---|---|
| 3,219,566 A | 11/1965 | Willis et al. | |
| 3,296,189 A | 1/1967 | Eastman | |
| 3,627,728 A | 12/1971 | Fernandez et al. | |
| 3,976,821 A * | 8/1976 | Carrow et al. | 428/412 |
| 4,419,408 A * | 12/1983 | Schmukler et al. | 428/424.4 |
| 4,477,532 A | 10/1984 | Schmukler et al. | |
| 4,548,779 A | 10/1985 | Steinberg et al. | |
| 4,678,577 A | 7/1987 | Thomas et al. | |
| 4,973,438 A | 11/1990 | Gaudreau | |
| 5,071,686 A * | 12/1991 | Genske et al. | 428/35.7 |
| 5,128,409 A | 7/1992 | Gaggar | |
| 5,833,913 A | 11/1998 | Ellwood et al. | |
| 6,099,924 A | 8/2000 | Nakamaki et al. | |
| 6,126,315 A * | 10/2000 | Ichikawa et al. | 383/43 |
| 6,410,141 B1 | 6/2002 | Grimmer | |
| 6,599,639 B2 | 7/2003 | Dayrit et al. | |
| 7,247,268 B2 | 7/2007 | Jousse et al. | |
| 7,923,121 B2 | 4/2011 | Jackson et al. | |

(Continued)

FOREIGN PATENT DOCUMENTS

JP 2006123532 A * 5/2006

OTHER PUBLICATIONS

Definition of "tank"; http://www.merriam-webster.com/dictionary/tank; 2010.*

(Continued)

*Primary Examiner* — James Yager
(74) *Attorney, Agent, or Firm* — Allan L. Harms; Shuttleworth & Ingersoll, PLC

(57) ABSTRACT

A multiple walled enclosure with low permeation properties and rugged impact resistance useful as a fuel tank or chemical container. The enclosure is made by rotomolding a first charge of thermosetting polymer into an outer layer, then rotomolding a charge of EVOH or other low permeation thermoplastic into a second layer, then rotomolding a second charge of thermosetting polymer into a third layer so that the low permeation thermoplastic layer is fully enclosed by layers of thermoset polymer. The preferred thermosetting polymer is crosslinkable polyethylene and the preferred low permeation thermoplastic is EVOH.

26 Claims, 6 Drawing Sheets

(56) References Cited

U.S. PATENT DOCUMENTS

| | | | |
|---|---|---|---|
| 2001/0054779 A1* | 12/2001 | Collette et al. | 264/247 |
| 2003/0161981 A1* | 8/2003 | Jousse et al. | 428/36.91 |
| 2004/0053054 A1* | 3/2004 | Bobovitch et al. | 428/409 |
| 2006/0083875 A1* | 4/2006 | Weaver | 428/35.2 |
| 2006/0147664 A1* | 7/2006 | Richards et al. | 428/35.7 |
| 2006/0211804 A1* | 9/2006 | Kim et al. | 524/445 |

OTHER PUBLICATIONS

Melting temperature of linear polyethylene; Polymer Handbook, Fourth Edition; V/14; 1999.*

Machine Translation of JP 2006123532 A; May 2006.*

EVAL; http://www.eval-asiapacific.com/media/30551/eval%20resins%20low%20res.pdf; retrieved Sep. 19, 2012.*

International Preliminary Report on Patentability PCT/US2007/087435, Centro, Inc et al.

Paxon(TM) 7000 Series High Density Polyethylene Resin Datasheet, ExxonMobile, 2009, www.exxonmobilepe.com.

Organic Peroxides-Crosslinking rubber, elastomer and polyethylene brochure, p. 13, 2009, Arkema, Inc., www.arkema-inc.com/crosslinking.com.

Flory, Fu, Lin, Cogen & Bolz, "Adhesion of Crosslinked Polymer Insulation to Copper and Tinned Copper Conductors", International Wire & Cable Symposium, Proceedings of the 58th IWCS/IICIT, Piscataway, New Jersey.

Third Party Submission dated Dec. 9, 2011 in Published Application No. 2011/0250371 by Clifford H. Kraft.

Steel vs. Plastics: The Competition for Light-Vehicle Fuel Tanks, JOM 48(7), 1996, pp. 22-25.

Rotational Molding Resins, PolyProcessing Technical Bulletin #T-0009, Oct. 1999.

Portion of Article from Marcel Dekker, Inc. Copyright 2000.

Quote from Tool and Manufacturing Engineers Handbook, Circa 1998.

Persico to Introduce New Plastic Rotomoulding Technology at the Plast'06 Exhibition 2006 Milan.

New Rotomolding Products & Processes for Lower Permeation Fuel Tanks, Gregory O'Brien, Atofina, 2004.

Third Party Submission dated Dec. 12, 2011 in Published Application No. 2011/0250371 by Clifford H. Kraft.

Cleveland 2004—ARM International 295th Annual Fall Conference.

Association of Rotational Molders—Member News for 2006.

Tomboh, et al., Crosslinked Polyethylene, Indian Journal of Chemical Technology, Nov. 2004, vol. 11, Mumbai, India.

SABIC Innovative Plastics, Weathering a practical approach.

* cited by examiner

MULTI-LAYER ROTATIONALLY MOLDED LOW PERMEATION VESSELS AND METHOD FOR MANUFACTURE THEROF

CROSS-REFERENCE TO RELATED APPLICATIONS

This application claims priority from provisional patent application entitled "Multi-Layer Rotationally Molded Low Permeation Vessel And Method for Manufacture Thereof," Ser. No. 60/875,196 filed Dec. 15, 2006. The disclosure of provisional patent application Ser. No. 60/875,196 is hereby incorporated in its entirety.

FIELD OF INVENTION

This invention relates to a process for manufacturing hollow seamless plastic parts using the rotational molding process.

BACKGROUND OF THE INVENTION

For current rotomolding fuel tank technology, single layer (typically 2.5 to 20 mm thick) crosslinked polyethylene is commonly used for the production of fuel tanks, chemical vessels and many other containment-type products. This material is widely known as having very tough and durable qualities that allow it to be used in such demanding applications. Also, the rotational molding process allows very complex shapes to be manufactured from these types of materials. In many cases, rotational molding is the only plastics production method that could be used to economically produce such complex shapes. However, crosslinked polyethylene does allow the permeation of hydrocarbons and other fluids and vapors at rates that do not conform to some current and future environmental regulations e.g. California Air Resource Board (CARB) and the Environmental Protection Agency (EPA). Therefore, there is a need to develop a lower permeation material for the rotational molding process that meets industry standards and has suitable mechanical properties for these applications.

The production of rotationally molded products with two layers of materials is common practice in the industry today. Typical material combinations include polyethylene and polyurethane, polyethylene and polyethylene, polyethylene and polyethylene with a foaming agent, polyamide 11 and grafted polyethylene; to produce a structure that benefits from the combination of materials being used. This process typically uses a dropbox, which is attached to the mold, to store and then release the second charge of material into the mold at a critical temperature during the molding cycle.

Arkema Incorporated has developed a low permeation fuel tank solution using PetroSeal™ technology (reference International Publication No. WO 2004/045849 A1). This technology uses two layers of material, Rilsan® polyamide 11 and a grafted polyethylene, to produce a material combination that can be used by the rotational molding process to produce a vessel or tank with low permeation properties. However, Polyamide 11 lacks low temperature dart impact strength, which may limit the applications it can be used for. The cost of Polyamide 11 may also be a limiting factor.

U.S. Pat. No. 6,946,176 B2 refers to the development of a multi-layer thermoplastic structure that can be produced by the rotational molding process. This technology can be used to produce a bladder with a thermoplastic barrier material with a high viscosity (such as ethylene vinyl alcohol), enclosed between two layers of thermoplastic materials (such as linear polyethylene or polyamide). The intended application for this combination of materials is to produce a multi-layer bladder for high-pressure gas tanks or bottles.

For other plastics processes such as blow molding, thermoforming and injection molding, thermoplastic materials such as polyethylene, ethylene-vinyl alcohol, polypropylene, polybutene, polybutylene terephthalate, polyethylene terephthalates, or polyamide 6, 11 and 12 can be used to produce a low permeation vessel or container. In particular, blow molding uses a multi-layer system using virgin polyethylene, regrind polyethylene, adhesive, ethylene-vinyl alcohol, adhesive, and virgin polyethylene. This is a commonly accepted method to produce a seamless, low permeation fuel tank using the blow molding process. Thermoforming has the ability to use this combination of materials in pre-formed sheets which can then be heated and used to form two halves of a vessel or tank, which can then be joined together while still hot to produce a sealed object with low permeation properties. This is referred to as twin-sheet thermoforming. Injection molding can also use some of the materials previously listed, however the process to manufacture a vessel or a tank requires that two or more molded pieces must be formed and then later fused or welded together, in order to make the structure leak-proof. A low permeation vessel with high impact and moisture resistance that can be formed by rotomolding is needed to meet increasing standards for environmental protection.

SUMMARY OF THE INVENTION

The present invention pertains to a vessel with high impact resistance and with a low permeation rate. Particularly, the invention uses a combination of thermoset materials and a thermoplastic to provide a low permeation, shock absorbent, moisture resistant vessel, ideal for storing fuel or other hydrocarbons.

According to the invention, the vessel comprises the use of successive layers of materials to produce a multi-layer structure, with low permeation properties. Two of these layers, which form the external and internal layers of the vessel, are between 0.1 mm and 20 mm thick and are made from crosslinked polyethylene (a thermoset material), with a density of between 0.92 and 0.96 $g/cm^3$. Another layer is located between the thermoset layers, and is between 0.1 mm and 10 mm thick and is made from ethylene-vinyl alcohol copolymer, with a density of between 1.00 and 1.30 $g/cm^3$. This type of multi-layer structure is of particular benefit when functioning as a fuel tank or vessel to minimize the transfer of vapors or emission of the fluid or gas being contained at low pressure.

This disclosure details several processes to make such a vessel by rotomolding. A thermoset polymer such as crosslinkable polyethylene is placed in a mold and rotated around multiple axes while being simultaneously heated, causing the thermoset polymer to sinter and melt, coating the inside of the mold with the thermoset polymer. A thermoplastic such as ethylene-vinyl alcohol is introduced into the mold and heated until it melts, and again the mold is rotated around multiple axes. Then an additional charge of a thermoset polymer is added to the mold. Once again, the mold is heated and rotated, then allowed to cool. In this example, the vessel formed will have three layers, a thermoplastic layer encompassed by two thermoset material layers.

In addition to this method, a concurrent melting of one of the thermoset material layers and the thermoplastic layer allows a multilayer vessel to be manufactured without one or more of the heating steps. Also, the addition of adhesive agents such as maleic anhydride may be used to provide greater adhesion between the thermoset and thermoplastic layers. This greater adhesion may be accomplished by adding an adhesion material directly to one or all the materials prior to molding or compounding an adhesion material into one or all the materials used to form the multi-layer structure prior to molding, or adding adhesion materials as distinct tie-layers between some or all of the existing layers of the structure.

Depending on the choice of materials and the processes implemented, a multi-layer vessel can have layers composed of different materials. However, what is required is an impermeable thermoplastic core surrounded by a thermoset material on each side. It is the primary object of the invention to provide a low cost, low permeation vessel of high impact resistance.

Another object of this invention is to provide a process for manufacturing a hollow seamless vessel with low permeation properties, using the rotational molding process.

It is also an object of the invention to provide a multi-layer, durable, low permeation vessel to store volatile liquids such as gasoline.

It is a further object of the invention to provide a process for manufacturing an impact resistant, low permeation vessel through the process of rotomolding.

It is yet another object of the invention to provide a multi-layer vessel composed of a low permeation thermoplastic layer bounded by thermoset layers.

These and other objects of the invention will become apparent from examination of the description and claims which follow.

DESCRIPTION OF THE DRAWING FIGURES

DETAILED DESCRIPTION OF THE INVENTION

Definitions

Figure 1:
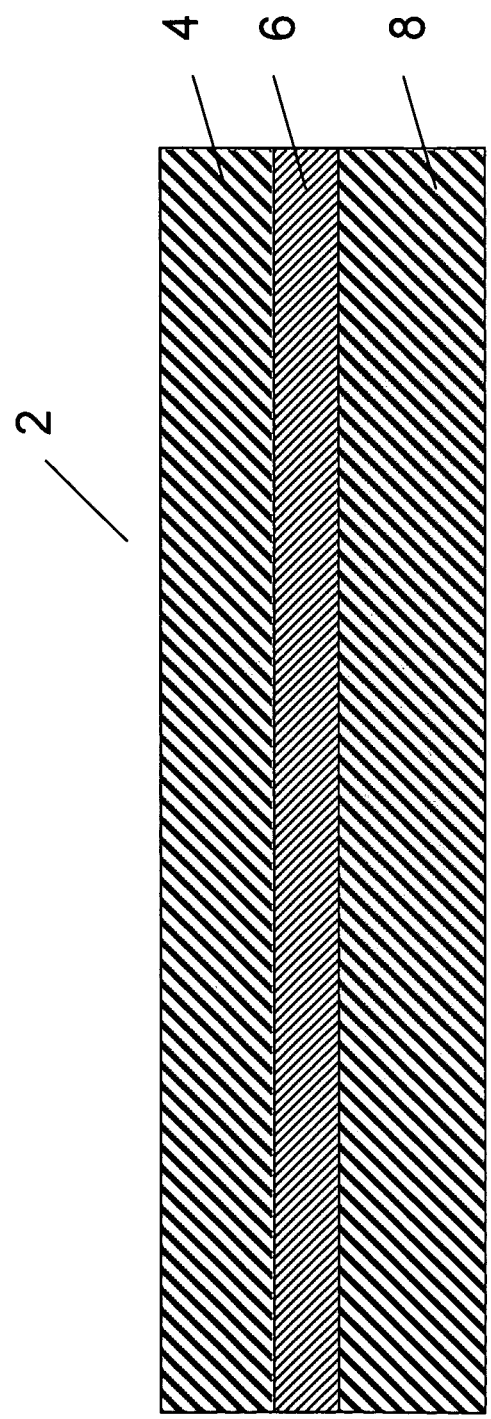
FIG. 1 is a cross-section view of a wall taken from a rotationally molded vessel showing a barrier layer located between two thermoset layers of crosslinked polyethylene.

A thermoplastic is a high polymer that softens when exposed to heat and returns to its original condition when cooled to room temperature. Natural substances that exhibit this behavior are crude rubber and natural waxes; however the term is usually applied to synthetics such as polyvinyl chloride, nylons, fluorocarbons, linear polyethylene, polyurethane prepolymer, polystyrene, polypropylene, and cellulosic and acrylic resins. Richard J. Lewis Sr., *Hawley's Condensed Chemical Dictionary*, Fourteenth Edition.

A thermoset is a high polymer that solidifies or "sets" irreversibly when heated. This property is usually associated with a crosslinking reaction of the molecular constituents induced by heat or radiation, as with proteins, and in the baking of doughs. In many cases, it is necessary to add "curing" agents such as organic peroxides or, in the case of rubber, sulfur. For example, linear polyethylene can be crosslinked to a thermosetting material by either radiation or chemical reaction. Phenolics, alkyds, amino resins, polyesters, epoxies, and silicones are usually considered to be thermosetting, but the term also applies to materials in which additive-induced crosslinking is possible, e.g. natural rubber. Richard J. Lewis Sr., *Hawley's Condensed Chemical Dictionary*, Fourteenth Edition.

The structure of this invention is a multi-layer rotationally molded structure, comprising at least two layers of material, at least one of which is a low permeation thermoplastic and the other a high impact resistance thermoset.

In the preferred embodiment the low permeation thermoplastic is ethylene-vinyl alcohol. According to the invention, the ethylene-vinyl alcohol copolymer may be defined as having the following formula:

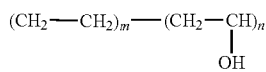

where "m" is the number of repeat units of ethylene monomer and "n" is the number of repeat units of the vinyl alcohol monomer. The ethylene monomer content according to this invention is between 20 and 60% in moles in the polymer.

The ethylene-vinyl alcohol copolymer will also be referred to as EVOH in the following.

EVOH copolymer has excellent barrier properties to gases and hydrocarbons. However, there are many grades of EVOH materials available in the marketplace, with a range of different performing resins. When barrier properties are of primary interest, then a material with the lowest ethylene content should be used, provided it is suitable for the molding process. For example, a standard grade EVOH with an ethylene content of 38% has an $O_2$ transmission rate of 0.035 $cm^3 \cdot mil/100 \, in^2 \cdot day \cdot atm$ at 20° C. and 65% relative humidity, whereas a standard grade with an ethylene content of 48% has an $O_2$ transmission rate of 0.163 $cm^3 \cdot mil/100 \, in^2 \cdot day \cdot atm$ at 20° C. and 65% relative humidity.

Non impact modified EVOH copolymer has a high glass transition temperature (typically 40° C. to 80° C.), making this material brittle at room temperature or below. Therefore, where impact performance is critical and EVOH is not impact modified, it is important that the layers of material on either side of the EVOH have good impact properties.

EVOH copolymers are commercially available in the form of plastic pellets. Preferably, the commercial pellets need to be reduced in size using either a micro-pelletization process or a grinding process at ambient temperature or at cryogenic temperature. These size-reducing processes are necessary to produce a particle of lesser volume and greater surface area-to-volume ratio to accelerate the melting process for the raw material and to create an evenly distributed homogenous layer of EVOH copolymer throughout the object being produced. Typically for use in the rotational molding process, 35 Mesh or 20 Mesh resins or micro-pellets less than 0.7 mm in diameter or a combination of both, are used. According to this invention, EVOH can be used in any of these typical forms and particle size; additionally other non-typical particle sizes or combinations of particle configurations may be used to aid the natural separation of the various layers of materials during the rotational molding process.

The EVOH copolymer grades are available with a variety of different ethylene contents. This can affect not only the barrier properties, but also the melting point of the material. A material with less ethylene content will typically melt at a higher temperature. For example a standard grade EVOH with an ethylene content of 38% has a melting point of 179° C., whereas a standard grade with an ethylene content of 48% has a melting point of 158° C. Therefore, the EVOH copolymer grade may be selected based on its melting temperature (to aid natural separation) or its barrier properties (to reduce wall thickness) or a combination of both.

The density of the EVOH copolymer is determined according to ISO 1183 (alternatively ASTM D-1505 can be used). According to the invention, the ethylene-vinyl alcohol copolymer material has a density between 1.00 and 1.30 g/cm$^3$ and a melt flow index of greater than 4.2 g/10 minutes, at 190° C. using a 2160 gram load.

The melt index of the EVOH copolymer is determined according to ISO 1133 (alternatively ASTM D-1238 can be used). This test consists of measuring the extrusion rate of the material through an orifice of defined dimensions at a specified temperature and load. For EVOH, a temperature of 190° C. and a load of 2160 grams was used to measure the melt index.

According to this invention, the EVOH copolymer grade preferably has a high melt flow index, relative to other EVOH copolymers. In other words, the EVOH copolymer according to this invention performs better if it has a low viscosity to sinter, melt and flow into a uniform wall thickness providing an even distribution of the material. This is because, unlike other plastics processes, there is no pressure involved in rotational molding and so the material needs to have the ability to sinter and fuse together without the aid of shearing forces. Having a low viscosity will also aid the removal of bubbles from the melt during processing.

For some applications, in order for the invention to be economically viable, the EVOH copolymer must be capable of forming a very thin layer, for example less than 1 mm, to minimize the amount of EVOH material being used. For these types of applications in particular, the EVOH copolymer will benefit from having a high melt flow index.

EVOH copolymers are hygroscopic and therefore can absorb moisture from the atmosphere. The addition of moisture to EVOH reduces its mechanical, rheological and barrier properties. Thus, the multi-layer structure according to this invention is preferred in order to protect the EVOH material from moisture degradation by means of layers of water resistant thermoset crosslinked polyethylene being located either side of the EVOH material.

According to the invention, as an alternative to EVOH, one or more of the following materials can be used for the middle layer of the structure: polyamide 6 (PA 6), polyamide 66 (PA 66), polyamide 11 (PA 11), polyamide 12 (PA 12), acetal (also known as polyacetal), polyoxymethylene (POM), polyvinylidene fluoride (PVDF), polyetheretherketone (PEEK), polyethylene terephthalate (PET).

The external and internal layers of this structure are formed using crosslinked polyethylene (a thermoset material), with a density of between 0.92 and 0.96 g/cm$^3$.

Crosslinkable polyethylene is a high flow base resin, which promotes rapid melting and excellent mold surface reproduction during the molding process. This ability allows for very complex molded shapes to be formed, as well as features like thread profiles, kiss-offs, core holes, inserts, texture and graphics to be easily molded in.

Crosslinked polyethylene has enhanced adhesion properties, compared to linear polyethylene. For example, foam filling of rotationally molded structures suggests that polyurethane will adhere to crosslinked polyethylene, while it will not adhere to linear polyethylene. According to this invention, crosslinked polyethylene will provide some adhesion with an EVOH middle layer.

Rotationally molded crosslinked polyethylene has exceptional environmental stress cracking resistance, thermal resistance, dart impact resistance and notched failure resistance. This material is suitable for long-term outdoor applications where UV stability is required.

Rotationally molded crosslinked polyethylene material is commonly used in applications to store hydrocarbon fuels or other aggressive chemicals. This material has outstanding performance and durability in this type of application and endurance to the severest of tests, including pressurization (to low levels), exposure to open flames, exposure to sub-zero temperatures and resistance to excessive loading.

According to the invention, one of the primary functions of the layers of thermoset materials is to protect the layer of EVOH and the molded vessel from impact shocks or excessive loading that could potentially cause damage to the EVOH layer, and therefore to the vessel. For structures comprising three or more layers, the impact strength of the vessel is directly correlated to the wall thickness of the inner layer. Therefore, the inner layer in such a structure must be made from crosslinked polyethylene.

According to the invention, the other main function of the layers of thermoset materials is to protect the EVOH layer from moisture.

According to the invention, the outer layer of thermoset material can be replaced by a thermoplastic material, whereas the inner layer of thermoset cannot. The outer layer of the vessel exists to protect the EVOH layer from moisture, to adhere to the EVOH and to flow into complex three dimensional features that are common in rotational molding. Therefore, the outer thermoset layer could be replaced with one or more materials such as: polyethylene (PE), grafted polyethylene (PEG), plasma treated polyethylene, ethylene vinyl acetate (EVA), without negatively affecting the impact properties or mechanical performance of the molded vessel.

According to this invention, the inner layer of crosslinked polyethylene can be omitted if a two layer construction has sufficient mechanical properties to meet the requirements of the application. In this case, an impact modified version of the EVOH material may provide adequate impact strength.

Crosslinked polyethylene is commercially available in the form of plastic pellets or powder. Typically, 35 Mesh or 20 Mesh resins are required for the rotational molding process or micro-pellets less than 0.7 mm in diameter or a combination of both may be used. According to this invention, crosslinked polyethylene can be used in any of these typical forms and particle or pellet size, and other non-typical particle sizes or combinations of particle configurations may be used to aid the separation of the various layers of materials during the rotational molding process.

Molding Processing

The molding process requires the formation of distinct layers of materials. This can be achieved by depositing the second layer of material into the mold after the first layer has melted, then depositing the third layer of material into the mold after the second layer has melted. If additional layers are necessary (such as tie-layers), they would be added in a similar manner. According to the invention, this can be done manually, with a dropbox or by utilizing some other method(s) to segregate each layer of material naturally within the mold. For example, taking advantage of the different material inciting temperatures can aid natural separation; crosslinkable polyethylene has a melting temperature of between 120° C. and 130° C. and EVOH has a melting temperature between 150° C. and 200° C.

Additionally, other segregation techniques may be used to aid the natural separation process to form distinct layers. For example, these segregation methods relate to the following items: distinct particle or micropellet size for each material, particle or micropellet size distribution for each material, particle or micropellet shape, mold rotation speed, mold heating rates, containers to prevent the second and/or third layers from melting prematurely, particle or micropellet coating or treatment to delay melting or increase the melting temperature of the second and/or third layers, polymer bags to contain the second and/or third layers and prevent them from melting prematurely, or other thermally degradable containment methods.

According to the invention, some mixing of the outer two layers is acceptable, provided the inside surface of the second layer has formed a complete EVOH skin.

According to the invention, the inner layer of crosslinked polyethylene has a strong influence on the impact properties of the part being produced. To achieve optimum properties, there should be minimal mixing of the middle and inner layers. Provided the inner layer is mostly crosslinked polyethylene, then the impact strength will be directly related to thickness of this layer.

According to this invention, a rotationally molded crosslinked polyethylene, ethylene-vinyl alcohol copolymer, crosslinked polyethylene structure will have some adhesion between layers. This adhesion is a direct result of functionality on the surface of the crosslinked polyethylene as a byproduct of the crosslinked reaction. The primary functional groups contributing to the adhesion are believed to be the carbonyl and ester groups. The level of adhesion between crosslinked polyethylene and the EVOH copolymer is also related to the processing conditions, in particular, the temperature of each polymer, as each successive layer is added to the mold. However, if greater adhesion is required by the object being manufactured, then this can be achieved by chemically bonding each layer together, either by including a tie-layer of adhesive material between some or all of the existing layer or by adding an adhesive material as a percentage to some or all of the existing layers.

Also according to this invention, adhesive agents such as maleic anhydride or maleic anhydride grafted polyethylene, anhydride modified ethylene vinyl acetate (EVA), ethylene methyl acrylate (EMA), or other grafted polymers can be used to provide greater adhesion between the crosslinked polyethylene, ethylene-vinyl alcohol copolymer, crosslinked polyethylene structure. These materials can be included in different ways, for example:

- Added at a small addition level and mixed with one or all of the materials used to form the multi-layer structure prior to molding.
- Compounded into one or all of the materials used to form the multi-layer structure prior to molding.
- Added as distinct tie-layers between some or all of the existing layers of the structure.

Referring now to FIG. 1, a three-layer section of a vessel wall 2 is seen to comprise a first outer layer 4, a middle layer 6 and an inner layer 8. Middle layer 6 may be a thermoplastic material with higher resistance to passage of liquids or gases therethrough. In the preferred embodiment, the middle layer 6 of vessel wall 2 is a layer of ethylene-vinyl alcohol copolymer (EVOH). Outer layer 4 and inner layer 8 are preferably crosslinked polyethylene, which is a thermoset material which will not become pliable or flowable when reheated above its initial flow temperature. By first depositing outer layer 4 on the entire inside surface of an enclosing mold and rotating the mold about two or more axes while in an oven, the crosslinked polyethylene is flowed onto the inner mold surface and allowed to set. Thereafter EVOH in fine mesh or micropellet form is introduced into the mold cavity and the mold is returned to the oven and rotated about multiple axes to flow the EVOH onto all inner surfaces of the outer layer 4. The EVOH preferably has a density of about 1.00 to 1.30 g/cm$^3$ and a melt flow index of greater than 4.2 g/10 minutes, at 190° C. using a 2160 gram load.

Following deposit of the middle layer 6, an additional crosslinked polyethylene resin is introduced into the mold cavity and the mold is heated in the oven as it is again rotated about two or more axes, resulting in deposit of crosslinked polyethylene onto all internal surfaces of the middle layer 6 thereby creating the inner layer 8 of vessel wall 2.

Figure 2:
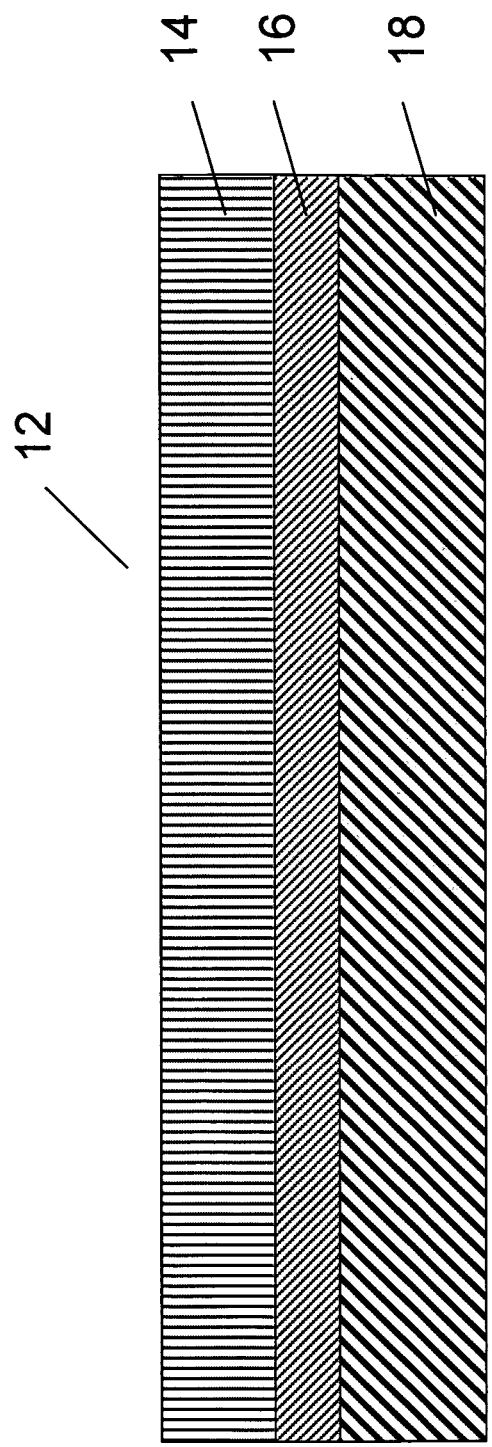
FIG. 2 is a cross-section view of a wall taken from a rotationally molded vessel showing a barrier layer partially mixed with an outside layer of crosslinked polyethylene to form the outer layer of the vessel.

FIG. 2 illustrates another alternative embodiment vessel wall 12, which includes first outer layer 14, middle layer 16 and inner layer 18. Outer layer 14 and middle layer 16 are formed concurrently by heating a combination of crosslinkable polyethylene and EVOH resins at the same time. Outer layer 14 comprises primarily crosslinked polyethylene, with some EVOH mixed in. This layer is formed by adding a mixture of fine mesh crosslinkable polyethylene and EVOH copolymer in coarse mesh or micropellet form to a mold. The fine mesh (less than 500 micron diameter particles) thermosetting crosslinkable polyethylene has a density of between approximately 0.92 and 0.96 g/cm$^3$. The coarse mesh or micropelletized (greater than 500 micron diameter particles) EVOH copolymer has a density of between 1.00 and 1.30 g/cm$^3$ and a melt flow index of greater than 4.2 g/10 minutes at 190° C. using a 2160 gram load. The mold is then heated and rotated about two or more axes at suitable rotation speeds to ensure adequate separation of the materials. After sufficient time in the heating environment, two layers will form, with an EVOH copolymer occupying middle layer 16 of vessel wall 12 on the inside of the mold. Thereafter, a charge of crosslinkable polyethylene is introduced into the mold cavity and the mold is again rotated about two or more axes while being heated sufficiently to cause the charge of crosslinkable polyethylene to flow and melt onto all internal surfaces of layer 16 of the vessel wall 12. The crosslinkable polyethylene is allowed to cure and set irreversibly, creating inner layer 18 of vessel wall 12. Then the mold is cooled while continuing in multi-axis rotation. The thickness of middle layer 16 will determine the barrier properties of the final structure.

Alternatively, vessel wall 12 may be manufactured by a method in which resins for outer layer 14 and middle layer 16 are concurrently loaded in the mold as described above. In addition, the thermosetting polymer resin, preferably crosslinkable polyethylene, enclosed within a heat degradable bag is placed in the mold at the same time to later form inner layer 18 of vessel wall 12. The heat degradable bag is selected to degrade and release the additional charge of thermosetting polymer after the middle layer 16 of vessel wall 12 has formed. Preferably outer layer 14 of vessel wall 12 will be primarily crosslinked polyethylene with some EVOH mixed in. The middle layer 16 of vessel wall 12 will be composed primarily of EVOH. The inner layer 18 of vessel wall 12 will preferably be another layer of crosslinked polyethylene.

Figure 3:
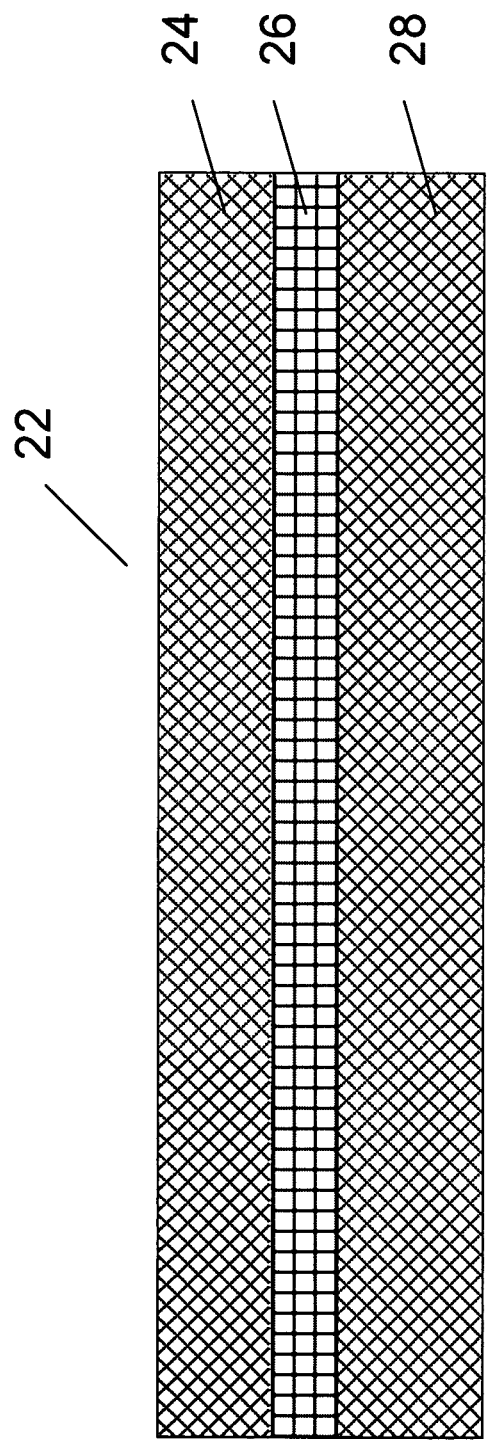
FIG. 3 is a cross-section view of a wall taken from a rotationally molded vessel showing a barrier layer mixed with an adhesion promoter, located between two thermoset layers of crosslinked polyethylene which may also contain an adhesion promoter.

Referring now to FIG. 3, a three-layer section of a vessel wall 22 is seen to comprise an outer layer 24, a middle layer 26 and an inner layer 28. Middle layer 26 may be a thermoplastic material with higher resistance to passage of liquids or gases therethrough. In the preferred embodiment, the middle layer 26 is a layer of ethylene-vinyl alcohol copolymer (EVOH) mixed with maleic anhydride grafted polyethylene with the mixture composed of about 5% maleic anhydride grafted polyethylene. Maleic anhydride grafted polyethylene is a thermoset material which will not become pliable or flowable when reheated above its initial flow temperature. Outer layer 24 and inner layer 28 are preferably crosslinked polyethylene mixed with maleic anhydride grafted polyethylene, in a mixture consisting of approximately 5% maleic anhydride grafted polyethylene. By first depositing outer layer 24 of vessel wall 22 on the inside surface of an enclosing mold and rotating the mold about two or more axes while in an oven, the crosslinked polyethylene mixed with 5% maleic anhydride grafted polyethylene is flowed onto the inner mold surface and allowed to set. Thereafter a mixture of about 95% EVOH and about 5% maleic anhydride grafted polyethylene resin in fine mesh or micropellet form is introduced into the mold cavity and the mold is returned to the oven and rotated about multiple axes to flow the EVOH and maleic anhydride grafted polyethylene mixture into all inner surfaces of the outer layer 24.

Following deposit of the EVOH mixed with maleic anhydride grafted polyethylene to make middle layer 26, an additional crosslinked polyethylene resin mixture containing approximately 5% of maleic anhydride grafted polyethylene is introduced into the mold cavity and the mold is heated in the oven as it is again rotated about two or more axes, resulting in deposit of crosslinked polyethylene mixed with maleic anhydride grafted polyethylene onto the internal surfaces of the layer 26 of EVOH mixed with maleic anhydride grafted polyethylene, thereby creating the inner layer 28 of the vessel wall 22.

Figure 4:
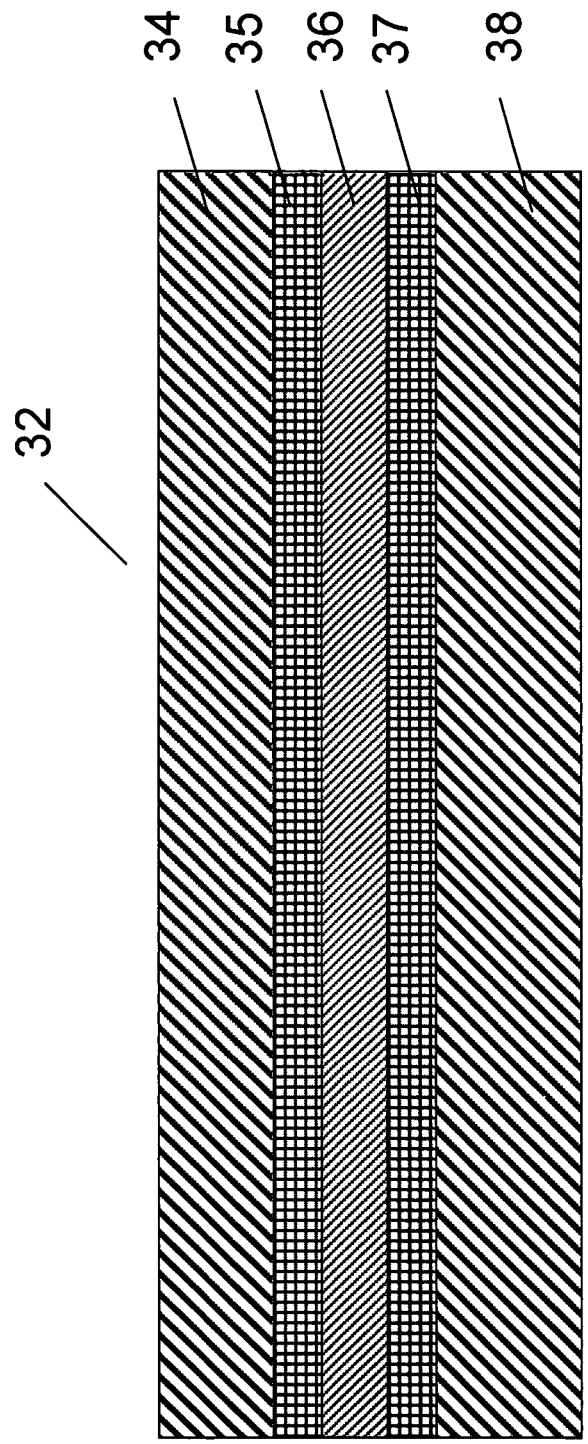
FIG. 4 is a cross-section view of a wall taken from a rotationally molded vessel with a five layer construction showing a middle barrier layer, tie-layers located on either side of the barrier layer, all contained between two thermoset layers of crosslinked polyethylene.

Referring now to FIG. 4, a five-layer section of a vessel wall 32 is seen to comprise an outer layer 34, a second layer 35, a third layer 36, a fourth layer 37, and an inner layer 38. The third layer 36 may be a thermoplastic material with higher resistance to passage of liquids or gases therethrough. In the preferred embodiment, the third layer 36 of vessel wall 32 is a layer of ethylene-vinyl alcohol copolymer (EVOH). Outer layer 34 and inner layer 38 are preferably crosslinked polyethylene, which is a thermoset material, which will not become pliable or flowable when reheated above its initial flow temperature. In the embodiment of FIG. 4 second layer 35 and fourth layer 37 are composed of an adhesion promoter such as maleic anhydride grafted polyethylene to serve as a tie layer to facilitate adhesion of layers 34 and 38 to layer 36. By first depositing outer layer 34 on the inside surface of an enclosing mold and rotating the mold about two or more axes while in an oven, the crosslinked polyethylene is flowed onto the inner mold surface and allowed to set. Thereafter a charge of maleic anhydride grafted polyethylene in fine mesh or micropellet form is introduced into the mold cavity and the mold is returned to the oven and rotated about multiple axes to flow the maleic anhydride grafted polyethylene into all inner surfaces of the outer layer 34 of vessel wall 32 to form second layer 35. Following the deposit of maleic anhydride grafted polyethylene as second layer 35 of vessel wall 32, EVOH in fine mesh or micropellet form is introduced into the mold cavity and the mold is returned to the oven and rotated about multiple axes to flow the EVOH into all inner surfaces of the second layer 35 of vessel wall 32 to construct third layer 36 of vessel wall 32, Following deposit of the third layer 36 of vessel wall 32, an additional adhesive polymer, such as maleic anhydride grafted polyethylene, in fine mesh or micropellet form, is introduced into the mold cavity and the mold is returned to the oven and rotated about multiple axes to flow the maleic anhydride grafted polyethylene into all inner surfaces of the third layer 36 of vessel wall 32 to form fourth layer 37 of vessel wall 32. Following deposit of the maleic anhydride grafted polyethylene as fourth layer 37 of vessel wall 32, further charge of crosslinked polyethylene resin is introduced into the mold cavity and the mold is heated in the oven as it is again rotated about two or more axes, resulting in deposit of crosslinked polyethylene onto the internal surfaces of the second maleic anhydride grafted polyethylene layer, i.e. fourth layer 37 of vessel wall 32, thereby creating the fifth layer 38 of the vessel wall 32.

A vessel wall may alternatively comprise an outer layer of a thermosetting polymer material, preferably crosslinked polyethylene, and an inner layer of thermoplastic material, preferably EVOH. An adhesion layer may be interposed between the outer crosslinked polyethylene layer and the inner EVOH layer by successive loading of the mold with selected resin as set forth above.

EXAMPLE 1

A vessel composed of a 1.5 mm thick layer of crosslinked polyethylene on the outside, a 1 mm thick layer of ethylene-vinyl alcohol copolymer in the middle and a 2.5 mm thick layer of crosslinked polyethylene on the inside, was manufactured using the rotomolding process. The vessel was manufactured using commercial grades of these materials, with melting temperatures of approximately 125° C. for crosslinked polyethylene and 160° C. for ethylene-vinyl alcohol copolymer.

Figure 5:
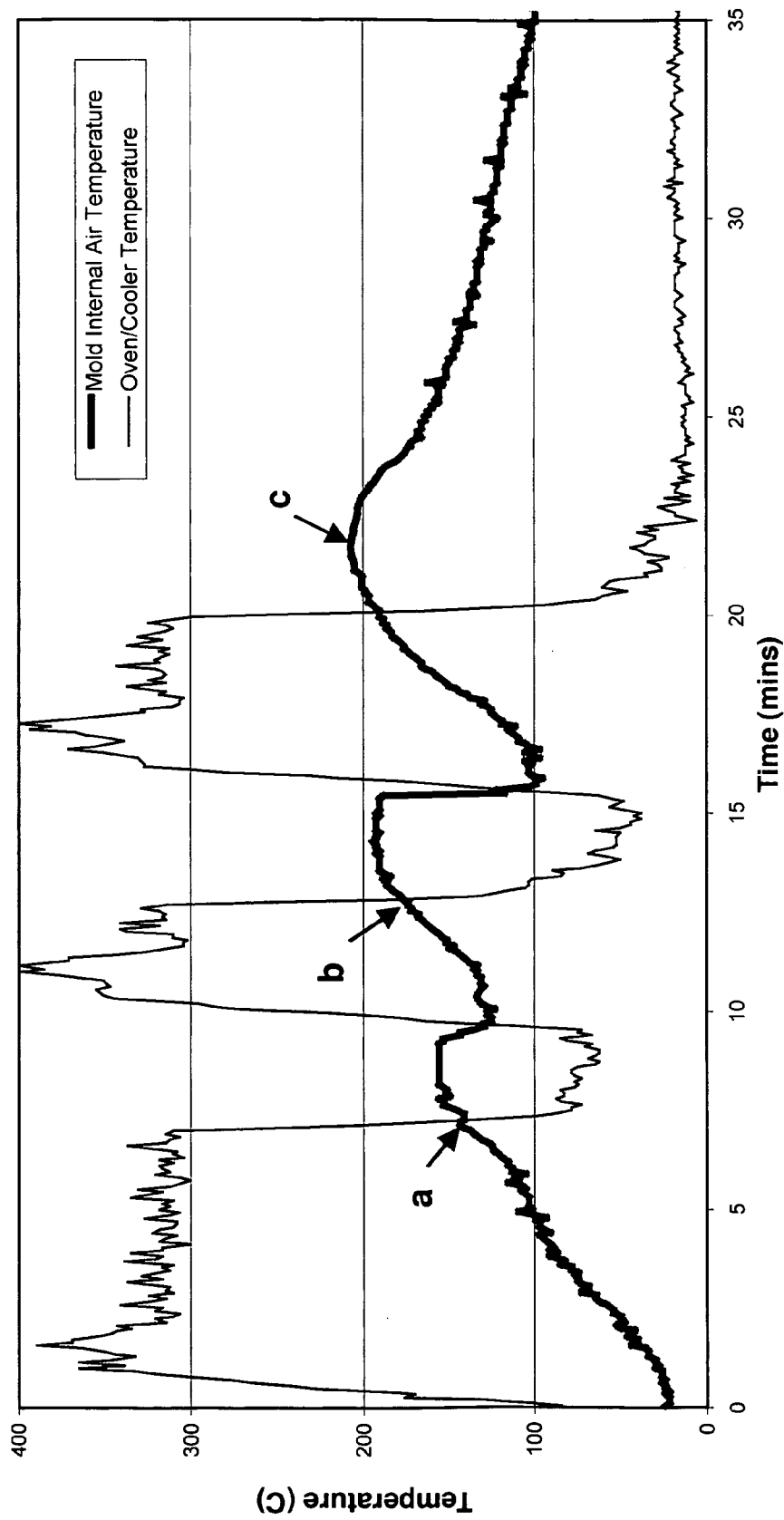
FIG. 5 is a graphic representation of the temperature variation of the atmosphere inside a rotatable mold and the temperature variation of the atmosphere in which the mold travels, i.e. the oven and cooling chambers. This particular thermal cycle is representative of the process used to produce a rotationally molded vessel with three distinct layers of material as depicted in FIG. 1.

The molding cycle consisted of charging the mold with enough crosslinkable polyethylene material so as to form the 1.5 mm (average) thickness external layer. Once this material had melted and fused together, the second layer of ethylene vinyl alcohol copolymer was added to the mold through the vent port forming a 1 mm thick middle layer. Once the middle layer had melted and fused together, a third layer of crosslinkable polyethylene was added to the mold through the vent port forming the 2.5 mm inner layer of the vessel. During this process, the internal air temperature of the molding cycle was monitored and used to determine when each layer had melted and therefore, when the next layer should be added. FIG. 5 shows a graphic illustration of the thermal cycle experienced during this molding process.

From FIG. 5 it can be observed that each layer of material was heated above and beyond its melting point, prior to the next layer being introduced to the mold. In this figure:
   a—identifies the point at which the charge of crosslinked polyethylene has melted and formed a first layer and a charge of EVOH copolymer is introduced to the mold;
   b—identifies the point at which the EVOH copolymer has melted and formed a second layer and an additional charge of crosslinkable polyethylene is introduced to the mold;

c—identifies the point at which additional charge of crosslinkable polyethylene has melted and formed a third layer and the mold has reached a suitable peak internal air temperature to ensure thermal crosslinking of the external and internal layers of material.

The vessel of Example 1 was produced using rotational molding equipment, which is used to biaxially rotate the mold inside an oven and cooling chamber environments. During the heating stage of the process the mold was indexed to and from the oven to facilitate the dispensing of the second and third layers. Once the third layer was fully cured, the mold was indexed to the cooling chamber where the thermoset outside/inside layers and the thermoplastic middle layer solidified.

During this molding process standard material particle sizes such as 35 Mesh were used to form each layer of the molded article. Standard mold rotation speeds such as eight revolutions per minute on the primary axis and two revolutions per minute on the secondary axis were used. This process was used to produce a vessel with a cross-section similar to that illustrated in FIG. 1.

The process outlined in Example 1 could also be used to produce a vessel with a cross-section similar to that illustrated in FIG. 3, by simply including an adhesion promoter with the crosslinked polyethylene and EVOH copolymer materials.

EXAMPLE 2

A vessel composed of a 2 mm thick layer of crosslinked polyethylene mixed with ethylene-vinyl alcohol copolymer on the outside, a 0.5 mm thick layer of ethylene vinyl alcohol copolymer in the middle and a 2.5 mm thick layer of crosslinked polyethylene on the inside, was manufactured using the rotomolding process. The vessel was manufactured using commercial grades of these materials, with melting temperatures of approximately 125° C. for crosslinked polyethylene and 160° C. for ethylene-vinyl alcohol copolymer.

Figure 6:
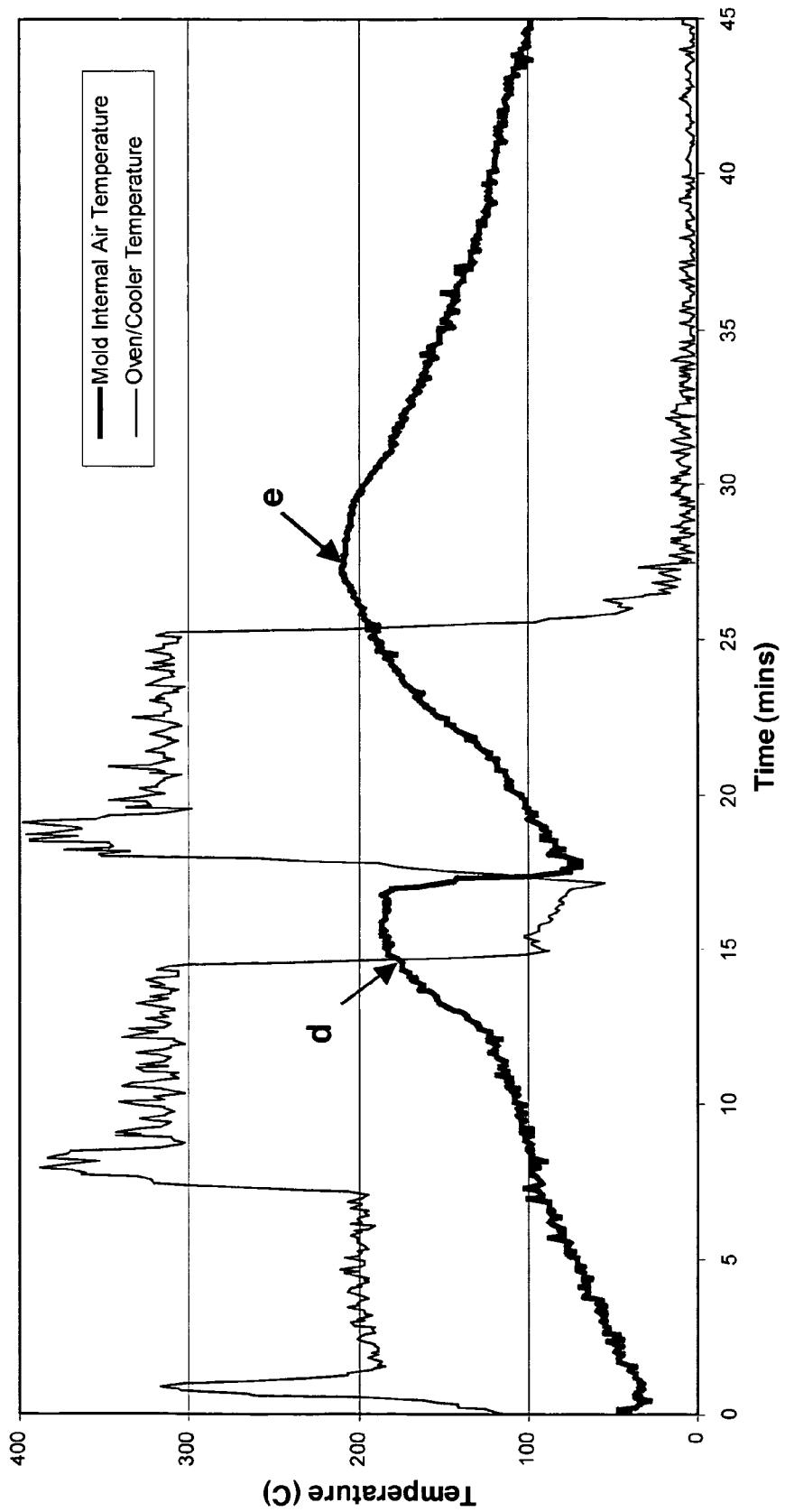
FIG. 6 is a graphic representation of the temperature variation of the atmosphere inside a rotatable mold and the temperature variation of the atmosphere in which the mold travels, i.e. the oven and cooling chambers. This particular thermal cycle is representative of the process used to produce a rotationally molded vessel with three distinct layers of material as depicted in FIG. 2.

The molding cycle consisted of charging the mold with both crosslinkable polyethylene and ethylene-vinyl alcohol copolymer. Once these two materials had melted and separated to form the first two layers, a charge of crosslinkable polyethylene was added to the mold using a dropbox forming the 3 mm inner layer of the vessel. During this process, the internal air temperature of the molding cycle was monitored and used to determine when each layer had formed and therefore, when the next resin should be added. FIG. 6 shows a graphic illustration of the thermal cycle experienced during this molding process.

From FIG. 6 it can be observed that each layer of material was heated above and beyond its melting point, prior to the next layer being introduced to the mold. In this figure:

d—identifies the point at which the first charge of crosslinked polyethylene and ethylene vinyl alcohol copolymer has melted and an additional charge of crosslinked polyethylene is introduced to the mold;

e—identifies the point at which the additional charge of crosslinkable polyethylene has melted and flowed thoroughly onto the inner surface of the EVOH layer and the mold has reached a suitable peak internal air temperature to ensure thermal crosslinking of the external and internal layers of material.

The vessel of this Example 2 was produced using rotational molding equipment, which is used to biaxially rotate the mold inside an oven and cooling chamber environments. With the oven at approximately 300° C., the mold containing fine mesh crosslinkable polyethylene material and coarse mesh EVOH was moved into the oven. At that point the oven temperature was reduced to 200° C. for approximately seven minutes while the rotation speed was increased, during which time the crosslinkable polyethylene material, being of a smaller particle size (less than 500 microns) and a lower melting point than the EVOH particles, naturally separated itself from the EVOH and coated the inside of the enclosed mold. After the period at 200° C., the oven was again heated in excess of 300° C. and allowed to quiesce at 300° C. for a seven to eight minute duration, whereupon the EVOH, with a larger particle size (greater than 500 microns), sintered and melted to form a coating on the inside of the cross linked polyethylene layer coated during the first 200° C. period. The mold was then indexed from the oven and a second charge of crosslinkable polyethylene resin was introduced into the mold. The oven temperature was raised to 300° C. and the mold was returned to the oven. The oven temperature was maintained at 300° C. while the second charge of crosslinkable polyethylene resin melted, crosslinked, and flowed into place forming an inner layer of crosslinked polyethylene coating the layer of EVOH. Thereafter the molded vessel was cooled at approximately 100° C. This process was used to produce a vessel with a cross-section similar to that illustrated in FIG. 2.

EXAMPLE 3

A vessel composed of a 1.5 mm thick layer of crosslinked polyethylene on the outside, a 0.5 mm thick layer of maleic anhydride grafted polyethylene, a 1 mm thick layer of ethylene-vinyl alcohol copolymer, a 0.5 mm thick layer of maleic anhydride grafted polyethylene, and a 2.5 mm thick layer of crosslinked polyethylene on the inside, was manufactured using the rotomolding process. The vessel was manufactured using commercial grades of these materials.

The molding cycle consisted of charging the mold with enough crosslinkable polyethylene material so as to form the 1.5 mm (average) thickness external layer. Once this material had melted and fused together, maleic anhydride grafted polyethylene was added to the mold through the vent port. Once the maleic anhydride layer had melted and fused together into a layer, a charge of ethylene vinyl alcohol copolymer was added to the mold through the vent port. Once the EVOH layer had melted and fused together, a second charge of maleic anhydride grafted polyethylene was added to the mold through the vent port. Once this maleic anhydride grafted polyethylene had melted and fused together into a fourth layer, another charge of crosslinkable polyethylene was added to the mold through the vent port forming the 2.5 mm inner layer of the vessel. During this process, the internal air temperature of the molding cycle was monitored and used to determine when each layer had melted and therefore, when the material for the next layer should be added.

The vessel was produced using rotational molding equipment, which is used to biaxially rotate the mold inside an oven and cooling chamber environments. During the heating stage of the process the mold was indexed to and from the oven to facilitate the dispensing of the second, third, fourth and fifth layers. Once the fifth layer was fully cured, the mold was indexed to the cooling chamber where the outside and inside layers of thermoset polymer and the thermoplastic layers solidified.

During this molding process standard material particle sizes such as 35 Mesh were used to form each layer of the molded article. Standard mold rotation speeds such as eight revolutions per minute on the primary axis and two revolutions per minute on the secondary axis were used. This process was used to produce a vessel with a cross-section similar to that illustrated in FIG. 4.

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the container. The embodiments illustrated were chosen in order to explain the principles of the invention and its practical application to enable one skilled in the art to utilize the invention in various embodiments and with various modifications as are suited to the particular use contemplated. It is intended that the scope of the invention be defined by the claims appended hereto, and by their equivalents.

Having described the invention, We claim:

1. A vessel comprising
a rotomolded hollow seamless fuel tank,
the fuel tank comprising:
an impact resistant external wall comprising a thermally cured thermoset polymer, the external wall formed by sintering and melting a high flow base thermosetting polymer resin in an enclosing mold as the mold is rotated about two axes, the thermosetting polymer resin having good mold reproducibility,
the external wall including internal surfaces,
an intermediate coating comprising low permeation thermoplastic polymer on the internal surfaces of the external wall, the low permeation thermoplastic polymer formed by sintering and melting a low permeation thermoplastic polymer resin in the enclosing mold while further rotating the mold about two axes,
the intermediate coating being an evenly distributed homogenous layer on all of the internal surfaces of the external wall,
the intermediate coating including internal surfaces,
an impact resistant internal coating comprising thermally cured thermoset polymer on the internal surfaces of the intermediate coating, the internal coating formed by sintering and melting additional thermosetting polymer resin in the enclosing mold as the mold is rotated about two axes,
the cured thermoset polymer of the external wall is crosslinked polyethylene,
the low permeation thermoplastic polymer of the intermediate coating is ethylene-vinyl alcohol copolymer,
the ethylene-vinyl alcohol copolymer having a melt flow index greater than 4.2 g/10 minutes at 190° C. using a 2160 g load, the cured thermoset polymer of the internal coating is crosslinked polyethylene.

2. The vessel of claim 1 wherein
the ethylene-vinyl alcohol copolymer has a density between about 1.00 and 1.30 g/cm$^3$,
the intermediate coating has a thickness between about 0.1 and 10 mm.

3. The vessel of claim 1 wherein
the intermediate coating is in direct contact with the internal surfaces of the external wall.

4. The vessel of claim 3 wherein
the internal coating is in direct contact with the internal surfaces of the intermediate coating.

5. The vessel of claim 1 wherein
one or more of the intermediate layer, the internal layer and the external wall comprises an adhesion agent.

6. The vessel of claim 5 wherein
the adhesion agent is taken from the group consisting of maleic anhydride, maleic anhydride grafted polyethylene, anhydride modified ethylene vinyl acetate, and ethylene methyl acrylate.

7. A plastic vessel comprising
a rotomolded seamless hollow tank comprising
a seamless external layer comprising thermally cured cross linked polyethylene;
the external layer having internal surfaces,
a seamless intermediate layer comprising low permeation thermoplastic polymer adhered to the internal surfaces of the external wall,
the intermediate layer being an evenly distributed homogenous layer on all of the internal surfaces of the external wall,
the low permeation thermoplastic polymer comprising ethylene-vinyl alcohol copolymer, the ethylene-vinyl alcohol copolymer having a melt flow index greater than 4.2 g/10 minutes at 190 degrees C. with a load of 2160 g,
the intermediate layer having internal surfaces,
a seamless impact resistant internal layer comprising thermally cured cross linked polyethylene;
the internal layer adhered to the internal surfaces of the intermediate layer.

8. The plastic vessel of claim 7 wherein
the crosslinked polyethylene of the external layer has a density between 0.92 and 0.96 g/cm$^3$,
the ethylene-vinyl alcohol copolymer of the intermediate layer having a density of between 1.0 and 1.3 g/cm$^3$,
the crosslinked polyethylene of the internal layer having a density between 0.92 and 0.96 g/cm$^3$.

9. The vessel of claim 7 wherein
the intermediate layer further comprises an adhesion promoter incorporated therein.

10. The vessel of claim 7 wherein
the crosslinked polyethylene of the external layer has a density between 0.92 and 0.96 g/cm$^3$,
the ethylene-vinyl alcohol copolymer of the intermediate layer having a density of between 1.0 and 1.3 g/cm$^3$,
the crosslinked polyethylene of the internal layer having a density between 0.92 and 0.96 g/cm$^3$,
the intermediate layer further comprises an adhesion promoter incorporated therein,
the intermediate layer in direct contact with the internal surfaces of the external wall,
the internal layer in direct contact with the internal surfaces of the intermediate layer.

11. The vessel of claim 7 wherein
the intermediate layer is in direct contact with the internal surfaces of the external layer;
the internal layer being in direct contact with the internal surfaces of the intermediate layer.

12. The vessel of claim 7 wherein
tie material is interposed between the external layer and the intermediate layer,
tie material is interposed between the intermediate layer and the internal layer,
the tie material being from the group consisting of maleic anhydride, maleic anhydride grafted polyethylene, anhydride modified ethylene vinyl acetate, and ethylene methyl acrylate.

13. The vessel of claim 7 wherein
one or more of the intermediate layer, the internal layer and the external wall comprises an adhesion promoter.

14. A vessel for storing fluids comprising
a rotomolded hollow seamless container having a wall,
the wall comprising:
a seamless external layer comprising cured thermoset polymer;
the cured thermoset polymer of the seamless external layer being cross linked polyethylene, the external layer comprising an external surface and an internal surface, a seamless intermediate coating comprising low permeation thermoplastic polymer adhered to the internal surface of the external layer, the low permeation thermoplastic polymer being ethylene-vinyl alcohol copolymer, the ethylene-vinyl alcohol copolymer being of low viscosity, the ethylene-vinyl alcohol copolymer having a melt flow index greater than 4.2 g/10 minutes at 190 degrees C. with a load of 2160 g, the intermediate coating being an evenly distributed homogenous layer on all of the internal surface of the external layer, the intermediate coating having an internal surface, a seamless internal coating comprising cured thermoset polymer adhered to the internal surface of the intermediate coating, the cured thermoset polymer of the seamless internal coating being cross linked polyethylene.

15. The vessel of claim 14 wherein
the external layer comprises cured cross-linked polyethylene of density between 0.92 and 0.96 g/cm$^3$,
the internal coating comprising thermally cured cross-linked polyethylene of density between 0.92 and 0.96 g/cm$^3$,
the ethylene vinyl alcohol copolymer of the intermediate coating having a density between about 1.00 and 1.30 g/cm$^3$,
one or more of the external layer, the intermediate coating, and the internal coating further comprises an adhesion agent,
the adhesion agent is taken from the group consisting of maleic anhydride, maleic anhydride grafted polyethylene, anhydride modified ethylene vinyl acetate, and ethylene methyl acrylate.

16. A vessel comprising
a rotomolded seamless hollow tank having a seamless wall of at least three layers, the wall comprising:
an external layer comprising cured cross-linked polyethylene,
the external layer having internal surfaces,
an intermediate layer comprising low permeation thermoplastic polymer,
the intermediate layer adhered to the internal surfaces of the external layer,
the low permeation thermoplastic polymer comprising ethylene-vinyl alcohol copolymer, the ethylene-vinyl alcohol copolymer having a melt flow index greater than 4.2 g/10 minutes at 190 degrees C. with a load of 2160 g,
the intermediate layer being an evenly distributed homogenous layer on all of the internal surfaces of the external layer,
the intermediate layer including internal surfaces,
an internal layer comprising cured cross-linked polyethylene,
the internal layer adhered to the internal surfaces of the intermediate layer.

17. The vessel of claim 16 wherein
the ethylene-vinyl alcohol copolymer of the intermediate layer has a density between 1.00 and 1.30 g/cm$^3$,
the cured cross-linked polyethylene of the external layer being of density between 0.92 and 0.96 g/cm$^3$,
the cured cross-linked polyethylene of the internal layer being of density between 0.92 and 0.96 g/cm$^3$,
the intermediate layer being adhered directly to the internal surfaces of the external layer,
the internal layer being adhered directly to the internal surfaces of the intermediate layer.

18. The vessel of claim 17 wherein
the external layer is between 0.1 mm and 20 mm thick,
the internal layer being between 0.1 mm and 20 mm thick.

19. The vessel of claim 18 wherein
the intermediate coating has a thickness between about 0.1 mm and 10 mm.

20. The vessel of claim 16 wherein
the intermediate layer comprises ethylene-vinyl alcohol copolymer in combination with an adhesion promoting agent from the group consisting of maleic anhydride, maleic anhydride grafted polyethylene, anhydride modified ethylene vinyl acetate, and ethylene methyl acrylate.

21. The vessel of claim 16 wherein
the intermediate layer comprises ethylene-vinyl alcohol copolymer in combination with maleic anhydride grafted polyethylene, the maleic anhydride grafted polyethylene being about 5% of the combination,
the intermediate layer being adhered directly to the internal surfaces of the external layer,
the internal layer being adhered directly to the internal surfaces of the intermediate layer.

22. The vessel of claim 16 wherein
the-ethylene-vinyl alcohol copolymer of the intermediate layer has a density between 1.00 and 1.30 g/cm$^3$,
the external layer of density between 0.92 and 0.96 g/cm$^3$,
the internal layer of density between 0.92 and 0.96 g/cm$^3$,
the intermediate layer being adhered directly to the internal surface of the external layer,
the internal layer being adhered directly to the internal surface of the intermediate layer,
the intermediate coating has a thickness between about 0.1 mm and 10 mm.

23. The vessel of claim 22 wherein
the intermediate layer further comprises an adhesion promoting agent from the group consisting of maleic anhydride, maleic anhydride grafted polyethylene, anhydride modified ethylene vinyl acetate, and ethylene methyl acrylate.

24. The vessel of claim 22 wherein
the intermediate layer is composed of approximately 95% ethylene-vinyl alcohol copolymer and approximately 5% maleic anhydride grafted polyethylene.

25. The vessel of claim 16 wherein
the intermediate layer comprises ethylene-vinyl alcohol copolymer and maleic anhydride grafted polyethylene.

26. The vessel of claim 16 wherein
the ethylene-vinyl alcohol copolymer of the intermediate layer has a density between 1.00 and 1.30 g/cm$^3$,
the cured cross-linked polyethylene of the external layer having a density between 0.92 and 0.96 g/cm$^3$,
the cured cross-linked polyethylene of the internal layer having a density between 0.92 and 0.96 g/cm$^3$,
the intermediate layer being adhered directly to the internal surfaces of the external layer,
the internal layer being adhered directly to the internal surfaces of the intermediate layer,
one of more of the intermediate layer, the external layer and the internal layer further comprises an adhesion promoting agent from the group consisting of maleic anhydride, maleic anhydride grafted polyethylene, anhydride modified ethylene vinyl acetate, and ethylene methyl acrylate,
the external layer being between 0.1 mm and 20 mm thick,
the internal layer being between 0.1 mm and 20 mm thick, the intermediate layer having a thickness between about 0.1 mm and 10 mm, the intermediate layer being adhered directly to the internal surface of the external layer, the internal layer being adhered directly to the internal surface of the intermediate layer.

* * * * *